Sept. 25, 1923.  1,468,807
J. F. GOOCH
COMBINATION CUTTING AND WELDING TORCH
Filed July 10, 1922
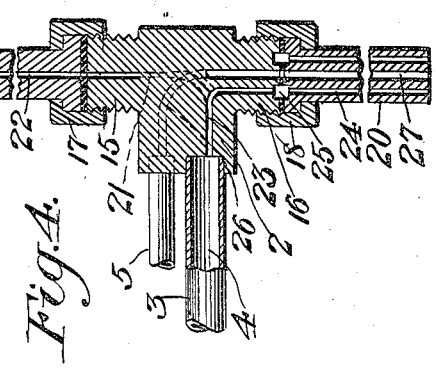
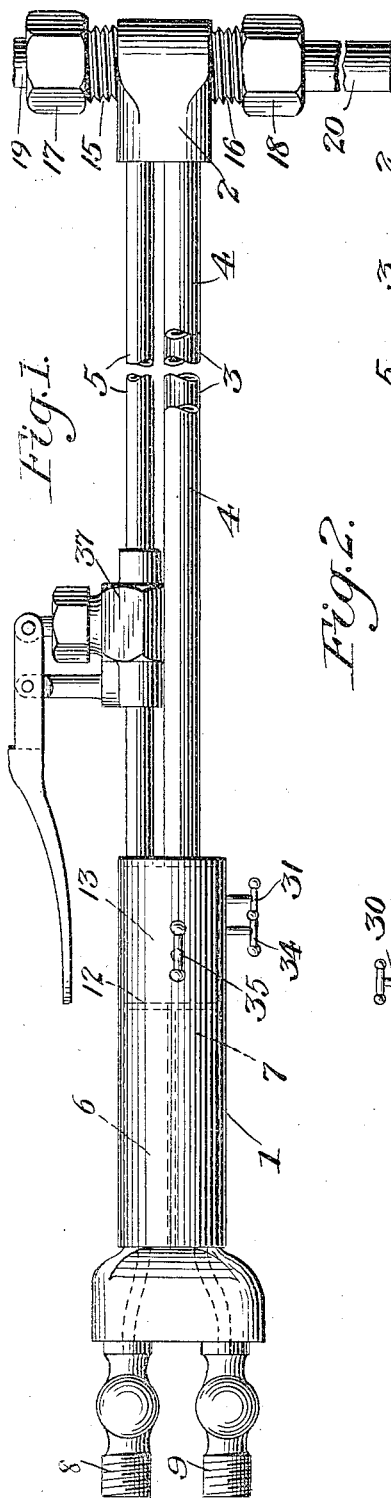
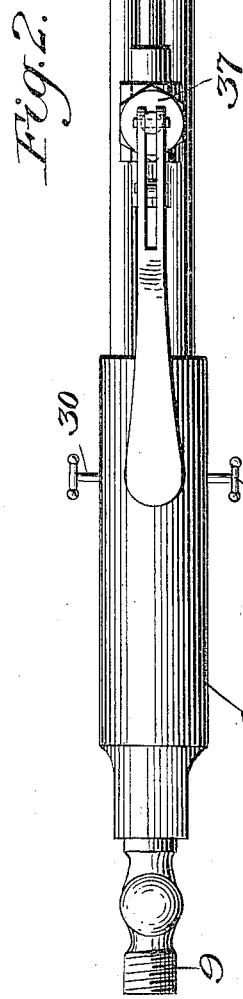
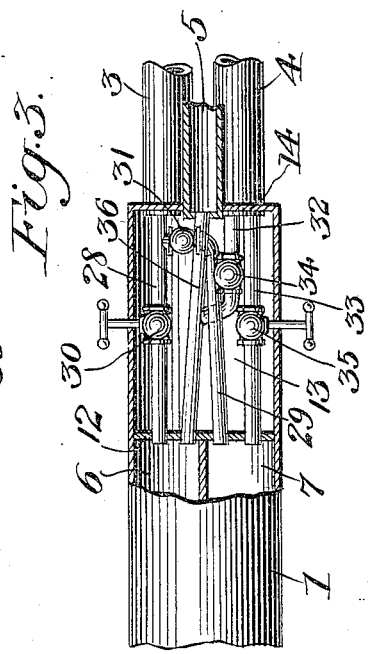
Inventor.
J. Frank Gooch Patented Sept. 25, 1923.

1,468,807

UNITED STATES PATENT OFFICE.

JAMES FRANK GOOCH, OF RALEIGH, NORTH CAROLINA.

COMBINATION CUTTING AND WELDING TORCH.

Application filed July 10, 1922. Serial No. 574,055.

*To all whom it may concern:*

Be it known that I, JAMES FRANK GOOCH, a citizen of the United States, residing at Raleigh, in the county of Wake and State of North Carolina, have invented certain new and useful Improvements in Combination Cutting and Welding Torches, of which the following is a specification.

This invention relates to certain improvements in cutting and welding torches, and particularly to a device of this character capable of performing both of these functions, without interfering with the arrangement or the interchanging of any part of the apparatus.

Torches for both welding and cutting, using oxygen and a combustible gas, preferably acetylene, are well-known and it is also old to provide a combined cutting and welding torch, but in all of these present combined types it is necessary to substitute a cutting burner tip for the welding tip or vice versa, according to the character of the work involved.

This substitution is necessary owing to the fact that the same tip cannot be used for both cutting and welding, as the cutting operation requires an additional or excess amount of oxygen which obviously calls for a tip capable of feeding this additional oxygen, all of which is well-known to one skilled in the art.

In these common types of combined cutting and welding torches, the outer end or head of the torch had but a single burner tip receiving portion, so that if the torch was being used for welding, and thereafter a cutting operation was required, a change of tips would be necessary and accordingly in so doing considerable time would be expended before operations could be resumed. This would be particularly noticeable where the work required, more or less simultaneously or intermittently, both of these operations.

Moreover to change these tips it is most always necessary to place the head of the torch in a vise, or the like, while the coupling or jam nut of the tip is being unscrewed. This operation, when continuously repeated for any length of time during the use of the torch, soon results in a flattening or distortioning of the head and a restricting of the passageway therethrough leading to the burner tip, all of which disadvantage having been noted upon the practical use and operation of this type of torch.

The object of the present invention is to eliminate as far as possible the various undesirable features above enumerated by providing a torch in which the head thereof is adapted to receive and carry simultaneously both a welding and cutting tip with the necessary passageways through said head for conducting the combustible mixture of acetylene and oxygen to both tips and an additional passageway to the cutting tip for supplying thereto the extra amount of oxygen necessary for the cutting operation.

These passageways are supplied by separate tubes extending from the handle of the device, into which handle is directed the supply of oxygen and acetylene, said handle being preferably divided longitudinally into two chambers for receiving these gases. These chambers do not extend the full length of the handle, but terminate a short distance from the inner end thereof, leaving sufficient space for a series of proportionately small tubes forming the proper connections from said chambers to the respective mixing tubes conveying the acetylene and oxygen to the separate cutting and welding tips, and also to the tube for supplying the additional oxygen to the cutting tip only.

Appropriate nipples are provided for connecting the main supply of acetylene and oxygen to the receiving chambers, and each of the small tubes leading therefrom is also equipped with a valve whereby the proper proportion of oxygen and acetylene can be admitted to the mixing tubes. The tube for supplying the additional oxygen to the acetylene tip is provided with a lever valve, as is usual in this type of apparatus, so placed as to be conveniently manipulated by the hand grasping the handle.

The preferred embodiment of the invention is illustrated in the accompanying drawings in which:—

Fig. 1 is a view in side elevation, part being broken away, illustrating the completely assembled device.

Fig. 2 is a top plan view thereof.

Fig. 3 is a fragmentary detail view illustrating the manner of supplying the oxygen and acetylene through individual tubes from the oxygen and acetylene chambers to the mixing tubes and to the auxiliary oxygen tube and subsequently to the proper burner tip, and Fig. 4 is a detail sectional view illustrating the manner of securing the welding and cutting tips to the head of the torch together with the passageways leading from the respective mixing and oxygen tubes to the welding and cutting tips.

Referring to the drawings in detail, the improved torch comprises generally, a handle portion 1, a head portion 2 and intermediate connecting mixing tubes 3 and 4 and an additional oxygen supplying tube 5.

The handle portion 1 is of the customary cylindrical shape, longitudinally divded into two chambers 6 and 7 for receiving the supply of oxygen and acetylene respectively. These chambers receive their charge from any definite source of supply through pipes, or the like, suitably connected at 8 and 9.

It will be noted that the chambers 6 and 7 do not extend the full length of the handle portion 1, but are terminated near the inner end thereof, by a transverse head or partition 12, providing a sub-chamber 13, for the purpose to be hereinafter more fully described.

The inner ends of the tubes 3 and 4, 5 are secured in the inner closed end 14 of the handle portion, see particularly Fig. 3, and the outer ends of said tubes are mounted in and support the head portion 2, as clearly shown in Fig. 4.

The head portion 2 is of T-form having oppositely disposed threaded extensions 15 and 16, to which are adapted to be secured, by coupling or jam nuts 17 and 18, welding and cutting tips 19 and 20 respectively.

The head 2 is also provided with a passageway 21, through which the mixture of oxygen and acetylene is conveyed from the mixing tube 3 to the single opening 22 of the welding tip 19, whereby the mixed fuel is conveyed to the end of said tip and burned as required for the welding process.

A similar passageway 23 oppositely disposed with respect to the passageway 21 is further provided in the head 2, connecting the mixing tube 4 with the radially disposed channels 24 of the cutting tip 20, by way of the small annular recess 25, formed at the junction of the tip and head, whereby the necessary mixture of oxygen and acetylene is supplied to said cutting tip.

As hereinbefore stated it is further necessary to provide for the admitting to the cutting tip an additional amount of oxygen to perform the desired cutting operation. To accomplish this the head tube is also constructed with a third passageway 26 leading from the outer end of the tube 5 to a centrally located channel or passageway 27, in the cutting tip 20, as clearly shown in Fig. 4.

The tubes 3, 4 and 5, receive their supply of gases at the inner ends thereof from the chambers 6 and 7 by way of a series of proportionately reduced tubes, properly arranged in the sub-chamber 13. The mixing tube 3 is connected to the oxygen and acetylene chambers 6 and 7 by the small tubes 28 and 29, respectively, individually controlled by valves 30 and 31, and the mixing tube 4 is similarly connected by the small tubes 32 and 33, likewise controlled by valves 34 and 35 respectively. The tube 5 for the extra supply of oxygen receives this gas from the chamber 6 through the small tube 36, the usual valve mechanism 37, being provided for governing the passageway of the oxygen through the tube 5 to the cutting tip, said valve mechanism being placed in such a position as to be manipulated by the hand grasping the handle portion 1, as shown in Figs. 1 and 2.

From the foregoing description it will be apparent in the operation of the device, that the desired mixture to the mixing tubes 3 and 4 leading to the respective welding tips 19 and 20, may be regulated or cut off entirely by the valves 30, 31, 34 and 35, according to which burner tip is to be used. The valve 37 will independently govern the extra supply of oxygen to the cutting tip, as occasion may demand, in the customary manner.

The advantages of the above described apparatus will be apparent to one skilled in the art, as both welding and cutting operations can be successively or intermittently performed without changing or altering any part of the torch, it only being necessary to operate the desired valves according to the operation required to suit the character of work contemplated.

What I claim is:

1. In a combined cutting and welding torch, the combination with means for receiving and dispensing a supply of oxygen and combustible gas, of a substantially rigid multiple tip receiving head therefor, means for simultaneously securing thereto separate cutting and welding tips and means separate from said head for controlling the necessary gas supply to said tips.

2. In a combined cutting and welding torch, the combination with means for receiving and dispensing a supply of oxygen and combustible gas, of a multiple tip receiving head therefor, means for simultaneously securing thereto separate cutting and welding tips, passageways in said head for conducting the necessary mixture of combustible gas and oxygen to each tip, a third passageway for conducting an additional amount of oxygen to the cutting tip, and means for regulating the supply of these gases.

3. In a combined cutting and welding torch, the combination with a handle portion, of a multiple tip receiving head portion, intermediate gas conducting tubes connecting said head and handle portions, means for receiving and dispensing the supply of oxygen and acetylene carried within said handle portion, means for simultaneously securing to the head portion, separate cutting and welding tips, passageways in said head for conducting the necessary mixture of combustible gas and oxygen to each tip, a third passageway for conducting an additional amount of oxygen to the cutting tip, said passageways being in communication with their respective conducting tubes, and means for regulating the supply of these gases.

4. In a combined cutting and welding torch, the combination with a hollow handle portion, of a multiple tip receiving head portion, intermediate gas conducting and mixing tubes connecting said head and handle portions, longitudinally disposed chambers formed in said handle portion for receiving and dispensing the necessary supply of oxygen and acetylene, said chambers terminating short of the inner end of said handle providing a third chamber, proportionately small tubes in said third chamber forming the proper communications between said gas chambers and gas conducting tubes, means for regulating the supply of gas to the gas receiving chambers and means associated with the proportionately small tubes for regulating the supply of the respective gases to the gas conducting and mixing tubes.

5. In a combined cutting and welding torch, the combination with a hollow handle portion, of a multiple tip receiving head portion, intermediate gas conducting and mixing tubes connecting said head and handle portions, chambers formed in said handle for receiving and dispensing the necessary supply of oxygen and acetylene, said chambers terminating short of the inner end of said handle providing a third chamber, proportionately small tubes in said third chamber forming the proper communications between said gas chambers and gas conducting tubes, means for simultaneously securing to the head portion separate cutting and welding tips, passageways in said head for conducting the necessary mixture of combustible gas and oxygen to each tip, a third passageway for conducting an additional amount of oxygen to the cutting tip, said passageway being in communication with their respective gas conducting tubes and means for regulating the supply and proper mixing of these gases.

In testimony whereof I affix my signature.

J. FRANK GOOCH.